No. 836,575. PATENTED NOV. 20, 1906.
F. G. HARBORD.
POWER TRANSMISSION.
APPLICATION FILED MAR. 3, 1906.
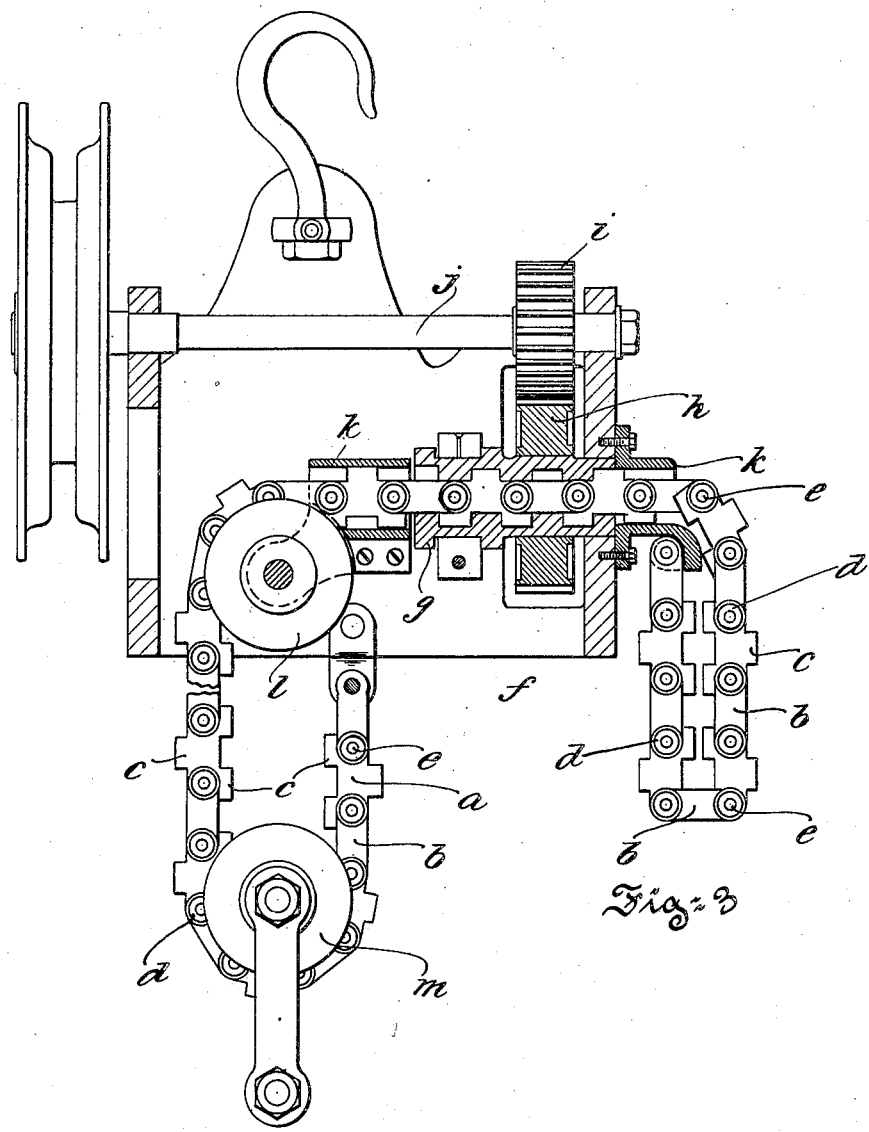
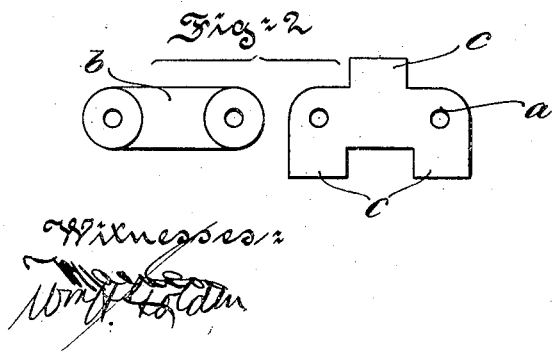
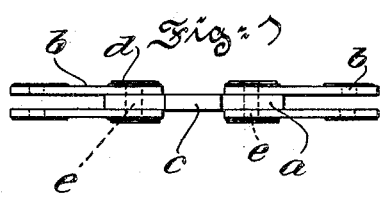
Witnesses:
Inventor:
Frederick G. Harbord

UNITED STATES PATENT OFFICE.

FREDERICK G. HARBORD, OF PHILADELPHIA, PENNSYLVANIA.

POWER TRANSMISSION.

No. 836,575.          Specification of Letters Patent.          Patented Nov. 20, 1906.

Original application filed September 29, 1905, Serial No. 280,686. Divided and this application filed March 3, 1906. Serial No. 304,132.

*To all whom it may concern:*

Be it known that I, FREDERICK G. HARBORD, a subject of the King of Great Britain, residing at the city of Philadelphia, in the county of Philadelphia and State of Pennsylvania, have invented certain new and useful Improvements in Power Transmission, (the same being a division of my application serially numbered 280,686 for a hoist,) of which the following is a specification.

The principal object of the present invention is to transmit motion from a revolving shaft without the use of sprockets to a chain of toothed links having engagement with an internally-threaded cylinder.

The invention consists of the improvements hereinafter described and finally claimed.

The nature, characteristic features, and scope of the invention will be more fully understood from the following description, taken in connection with the accompanying drawings, forming part hereof, and in which—

Figure 1 is a top or plan view of a portion of a chain of toothed links embodying the invention. Fig. 2 is a side elevational view of a toothed link and its complemental spacer; and Fig. 3 is a view, partly in elevation and partly in section, illustrating one mode of applying the invention.

Referring to the drawings, there is illustrated a chain of toothed links and its complemental spacers wherein $a$ represents the links and $b$ the spacers. As shown, each link is equipped with a trio of projections or teeth $c$, which in the present instance are formed integral with the links. These teeth, it will be observed, are so spaced that there is always one tooth opposite a pair of teeth upon a given link and that there are a pair of spacers alongside each link. Suitable washers $d$ and rivets $e$ are employed to complete the chain. The above-described chain is adapted to coöperate with an internally-screw-threaded cylinder, so that when a rotary motion is imparted to the cylinder the same will communicate the required movement of the chain. While various modes of applying my invention are possible, I have illustrated in the drawings a hoist equipped with the above-described chain as being a practical example. The frame $f$ carries the internally-screw-threaded cylinder $g$ and its gear-wheel $h$, to which a rotary motion is imparted through the pinion $i$ from the shaft $j$. Opposite the ends of the cylinder are guides $k$ to insure the chain to pass to the cylinder in proper alinement. A wheel $l$ is shown as journaled to one of the guides and accommodates the chain in its operation. The chain may be provided with an idler $m$.

I do not intend by the use of any technical terms herein to limit my invention thereby or in any way other than the prior state of the art may require; but,

Having thus described the nature and objects of the invention, what I claim as new, and desire to secure by Letters Patent, is—

1. The combination in a hoist of an internally-screw-threaded cylinder, a chain comprising a series of links, each link having a trio of projections and spacers connecting the links, guides arranged to present the chain to the cylinder and means for imparting a rotatable motion to the cylinder, substantially as described.

2. In mechanism for transmitting power, a chain comprising a series of links each link having a trio of projections and spacers connecting the links, an internally-screw-threaded member and means for imparting a rotatable motion to said member, substantially as described.

3. In mechanism for transmitting power, a chain comprising a series of links having a series of vertically-arranged projections upon each link and spacers connecting said links, a rotatable screw, and means for imparting a motion to said screw, substantially as described.

In testimony whereof I have hereunto set my hand and seal this 26th day of February, 1906.

FREDERICK G. HARBORD. [L. S.]

In presence of—
    PAUL V. CONNOLLY,
    WM. H. GOLDEN.